US006775037B1

(12) United States Patent
Lee

(10) Patent No.: US 6,775,037 B1
(45) Date of Patent: Aug. 10, 2004

(54) GRATING MATRIX RECORDING SYSTEM

(75) Inventor: Wai-Hon Lee, Cupertino, CA (US)

(73) Assignee: K Laser Technology, Inc. (TW)

(\*) Notice: Subject to any disclaimer, the term of this patent is extended or adjusted under 35 U.S.C. 154(b) by 0 days.

(21) Appl. No.: 10/393,681

(22) Filed: Mar. 20, 2003

(51) Int. Cl.[7] .............................................. G03M 1/04
(52) U.S. Cl. ............................. 359/35; 359/29; 359/30; 385/37; 430/1
(58) Field of Search ............................... 359/1, 20, 22, 359/25, 28, 29, 35, 9–11; 430/1–2; 378/36; 264/400; 385/28, 37

(56) References Cited

U.S. PATENT DOCUMENTS

| | | |
|---|---|---|
| 3,463,118 A | 8/1969 | Wood |
| 3,515,459 A | 6/1970 | Wood |
| 3,567,561 A | 3/1971 | Wood |
| 4,455,061 A | 6/1984 | Case |
| 4,510,575 A | 4/1985 | Mueller et al. |
| 4,568,141 A | 2/1986 | Antes |
| 5,032,003 A | 7/1991 | Antes |
| 5,058,992 A | 10/1991 | Takahashi |
| 5,229,872 A | 7/1993 | Mumola |
| 5,237,433 A | 8/1993 | Haines et al. |
| 5,291,317 A | 3/1994 | Newswanger |
| 5,307,184 A * | 4/1994 | Nishiwaki et al. ........... 359/494 |
| 5,428,479 A | 6/1995 | Lee |
| 5,475,511 A | 12/1995 | Haines et al. |
| 5,793,503 A | 8/1998 | Haines et al. |
| 5,822,092 A | 10/1998 | David |
| 6,023,356 A | 2/2000 | Kihara et al. |
| 6,046,856 A | 4/2000 | Takahashi et al. |
| 6,268,893 B1 | 7/2001 | O'Boyle et al. |
| 6,508,557 B1 | 1/2003 | Brennesholtz |
| 2003/0039001 A1 * | 2/2003 | King ............................ 359/35 |
| 2003/0152380 A9 * | 8/2003 | Holmes ...................... 396/429 |
| 2003/0161042 A1 * | 8/2003 | Long ............................ 359/566 |

OTHER PUBLICATIONS

Chigrinov "Electro–Optics of FLC with Low Spontaneous Polarization and High Dielectric Anisotrophy in π—Vmi Mode," in *Liquid Crystal Devices Physics and Applications*, Artech–House, Boston–London, pp. 191–192 (1999).

Holzbach "Three–Dimensional Image Processing for Synthetic Stereograms," Master of Science Thesis, submitted to Massachusetts Institute of Technology (1986).

Lee et al. "Optical configuration and color–representation range of a variable–pitch dot matrix holographic printer," Applied Optics 39:40–53 (2000).

Leung et al. "Ebeam computer generated holograms for espheric testing," SPIE Recent Advances in Holography 215:70–75 (1980).

\* cited by examiner

*Primary Examiner*—Drew Dunn
*Assistant Examiner*—Leo Boutsikaris
(74) *Attorney, Agent, or Firm*—Townsend and Townsend and Crew LLP

(57) ABSTRACT

A dot matrix system, which uses an electronic display panel as a diffractive optical device to produce two laser beams. The interference pattern of these two beams, at the focal plane of a lens, forms a grating spot with a shape and beam profile determined by the wavefronts diffracted by the electronic display device. The invention uniquely combines aspects of the interfering beam prior art and the prior art using an imaging display. Instead of simply reducing a diffraction image on a display device as in the imaging display prior art, the invention puts two different Fourier transforms on the display, the laser beam interacts with these Fourier transforms, and a lens focuses the two beams on the recording medium, with the two beams interfering with each other to produce the desired grating pattern. Because multiple orders of the wavefront will be produced by the display device, a light blocking element is used, with an aperture to pass only the desired order(s) of the beams.

16 Claims, 11 Drawing Sheets

GRATING MATRIX RECORDING SYSTEM

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

A Hologram is recorded by the interference of two coherent wavefronts. When a hologram is illuminated by one of the beams used in its construction process, the light diffracted by the hologram reconstructs the other wavefront completely, including phase and amplitude information. As such, if one of the wavefronts is originated from a three-dimensional object, an image of this 3D object can be reconstructed from its hologram. The term "hologram" is not only used to describe a device that reproduces the image of a 3D object, it is now commonly used to describe any device that can diffract light into a multitude of colors. These diffractive devices are used in graphic design for wrapping papers, package covers, labels to authenticate products and many other applications. It is difficult to pinpoint when the commercialization of such holograms began. In searching patent literature, an early U.S. Pat. No. 3,567,561 issued in 1971 described the use of composite grating structures as surface ornaments. Holograms displayed on credit cards are probably the earliest commercial holograms used on a large scale.

There are many methods for producing holograms. The 3D holograms on credit cards are called rainbow holograms (see U.S. Pat. No. 3,633,989). This type of hologram can produce 3D images with only horizontal parallax and can be reconstructed with a white light source. Ornamental surface type holograms are made by the interference of two parallel laser beams or two diverging laser beams with the same divergence cone. When a graphic pattern is composed of many hologram segments having different angles of rotation and different periods, each segment in the pattern has to be recorded sequentially on the same recording surface. For this reason a technique similar to a dot matrix printer was developed and used grating dots to construct graphic patterns. A patent was granted in Taiwan (Taiwan Patent 263565 issued in 1984) for one such system (see also U.S. Pat. No. 6,043,913). This Taiwan patent could be one of the earlier patents describing a dot matrix grating system for producing holograms. FIG. 1 shows the optical system for recording a dot matrix grating according to Taiwan Patent 263565. An incoming laser beam 101 is split into two beams 105 and 106 by beam splitter 104. These two beams are recombined at recording plane 108. Since only one lens 102 is used to focus the laser beam on surface 108, only one beam, 105 or 106, can be focused perfectly on surface 108. As a result, the diameter of the focused spots on surface 108 have to be sufficiently large so that both focused beams are within the depth of focus of lens 102. The period of the fringes within the overlapping beams is given by $$T = \frac{\lambda}{\sin\vartheta}.$$

The fringe period can be adjusted by changing the angle of the prism mirror 107. The orientation of the interference fringes is set by rotating the optical assembly consisting of prism 104 and prism mirror 107. There are a number of problems related to this early design:
(1) The required depth of focus results in a very large beam spot on the recording surface,
(2) The laser used in this system must have long coherent length because the optical path length of the two beams are not equal,
(3) The beams on the recording plane are circular in shape with non-uniform beam profiles.
(4) The fringes are not continuous across adjacent grating dots.

For these reasons, the resolution of the early dot matrix system was limited to about 400 dots per inch and not very efficient in diffracting light.

FIG. 2 shows a more recent system for recording dot matrix holograms. A laser beam 201 is directed by a mirror 202 to a beam splitter 203, with output beams 204 and 205. Beam 205 is directed to a prism mirror 206. This system uses additional prism mirrors 207, 208, 209 and 210 to equalize the optical path length to reduce the coherence requirement of the laser source. A lens 213 is also used to simultaneously focus beams 204 and 205 on the recording surface 214. The spot diameter on the recording surface is given by $\delta=\lambda F/d$, where $\lambda$ is the wavelength of the laser light, F is the focal length of lens 213 and d is the diameter of the laser beams. Suppose that a spot diameter $\delta=10$ $\mu$m is needed for the system and $\lambda=0.5$ $\mu$m, the ratio of $$\frac{F}{d}$$

is equal to 20. The period of the fringes is equal to $$T = \frac{\lambda}{2\sin\theta},$$

because both beams subtend an angle $\theta$ with respect to the optical axis. In FIG. 2 it can be seen that the focal length F and the diameter of the lens 213 is also related by $$\tan\theta = \frac{D}{2F}.$$

To obtain T=1 $\mu$m, the diffraction angle is equal to 14.5 degree. This angle determines that the lens 213 must be an f-2 lens. In this dot matrix system, prisms 211 and 212 can be moved up and down in unison to change the interference angle $\theta$ and hence the period of the fringes. In spite of the improvements in this more recent system over the system shown in FIG. 1, the problems related to beam shape, beam non-uniformity, and fringe continuity remained unsolved.

U.S. Pat. No. 5,291,317 proposed an optical system, which further resolved some of the aforementioned difficulties. FIG. 3 shows the optical system according to U.S. Pat. No. 5,291,317. A laser beam 301 illuminates a mask 302 and a grating 303. The lens 307 produces a de-magnified image of the grating on the, recording surface 308. The mask 302 defines an aperture so that the shape of the grating dot on the recording surface 308 can be rectangular, hexagonal or circular in shape. The laser beam 301 has been expanded so that its intensity profile, between its perimeters 304 and 305, on the grating 303 is nearly uniform. The grating is mounted on a rotary stage so that its fringes can be rotated under computer control. This system is simple in concept but with a fundamental optical restriction on the lens 307. Suppose that the lens 307 has focal length F=10 mm and it is used to de-magnify the grating image by a factor 10. In order to record a grating dot with a fringe spacing of 1 $\mu$m, with a laser wavelength of $\lambda$=0.5 $\mu$m the period of the grating 303 is 10 $\mu$m. The diffraction angle of this grating according to relationship sin $\theta$=$\lambda$/T is equal to 2.86 degree. To achieve the 10× reduction, the grating is approximately 100 mm from the lens. Therefore, $1^{st}$ order beam will be at a distance 5 mm from the center of the lens 307. This means that ratio of the focal length to the diameter of the lens (f-numer) is about 1. This lens is difficult to design, if not impractical. This difficulty can not be avoided by using smaller de-magnification. For example, reducing the de-magnification to 5 will reduce the distance between the grating 303 and the lens 307 to 50 mm. However, the diffraction angle will increase from 2.86 degrees to 5.74 degrees. The result is still that we need a lens aperture equal to the focal length of the lens. However, when a laser is used as the light source and a spatial filter 306 is used to block the $0^{th}$ order wave from the grating 303, the intensity variation on plane 308 has twice the spatial frequency of grating 303. This phenomenon can be explained as follows. Suppose that the complex amplitude of the phase grating image on the recording plane is given by $$i(x) = 1 + \sin\left(\frac{2\pi x}{T}\right).$$

After the aperture 306 stops the $0^{th}$ order of grating 303, the intensity variation on the recording plane 308 is equal to $$I(x) = \left[\sin\left(\frac{2\pi x}{T}\right)\right]^2 = \frac{1}{2}\left[1 + \cos\left(\frac{4\pi x}{T}\right)\right]$$

Because of this coherent effect, the system as described in FIG. 3 can use an f-2 lens instead of an f-1 lens to record grating dot with 1 $\mu$m fringes. The fringes in adjacent grating dots produced by this system are still not contiguous.

Another method for producing grating patterns is shown in U.S. Pat. Nos. 4,510,575 and 6,268,893 show grating or hologram images being put on a display screen, with optics being used to reduce the image and focus it onto a recording substrate. The '575 patent shows a microscope reducing an image from a CRT. The '893 patent shows a laser beam being projected through a LCD (Liquid Crystal Display), which is then imaged onto a recording material.

BRIEF SUMMARY OF THE INVENTION

This invention describes a novel dot matrix system, which uses an electronic display panel as a diffractive optical device to produce two laser beams. The interference pattern of these two beams, at the focal plane of a lens, forms a grating spot with a shape and beam profile determined by the wavefronts diffracted by the electronic display device.

The invention uniquely combines aspects of the interfering beam prior art and the prior art using an imaging display. Instead of simply reducing a diffraction image on a display device as in the imaging display prior art, the invention puts two different Fourier transforms on the display, the laser beam interacts with these Fourier transforms, and a lens focuses the two beams on the recording medium, with the two beams interfering with each other to produce the desired grating pattern. Because multiple orders of the wavefront will be produced by the display device, a light blocking element is used, with an aperture to pass only the desired order(s) of the beams.

In one embodiment, the display device is a LCD. The laser can be projected onto the LCD through a beamsplitter from the front, then reflected back through the beamsplitter, aperture and lens to the recording medium. Alternately, the laser beam can be directed through the LCD from behind. By controlling the display, the two wavefronts are produced, with the middle portion of the laser beam being blocked, to result in two distinct beams emanating from the LCD. In one embodiment, the LCD modulates the amplitude of the laser wavefront, in other embodiments it modulates the phase.

The position of the recording medium relative to the optics can be moved after each spot, generating a grid of spots, each spot having its own grating pattern. Another feature of the present invention allows the fringes making up the grating for a spot to be slightly altered so that they line up with the fringes of an adjacent spot, making the fringes contiguous across the adjacent boundary.

BRIEF DESCRIPTION OF THE DRAWINGS

FIG. 4($b$) is a modification of the diagram of FIG. 4($a$) illustrating the blocking of unwanted orders of the reflected beams.

FIG. 5($b$) is a diagram illustrating the Fourier transform of the beam on the square aperture of FIG. 5($a$).

FIG. 7($b$) is a diagram of adjacent grating spots on the recording medium with contiguous fringes.

DETAILED DESCRIPTION OF THE INVENTION

FIG. 4($a$) shows the top view of the optical system of one embodiment of the present invention. A collimated laser beam 402 with optical axis 401 is incident on a polarization beam splitter 403, which reflects beam 402 towards a display panel 404. LCD panels such as panel 404 are currently used in many image projection systems. The orientation of the molecules of the liquid crystal in the panel can be affected by a voltage applied on the liquid crystal layer. When a linear polarized light passes through the liquid crystal layer, its polarization is changed by the orientation of the molecules of the liquid crystal. As a result, when such a beam passes through an analyzer or a polarization beamsplitter, the brightness of the beam can be controlled by the voltage applied to the liquid crystal layer.

Figure 4A:
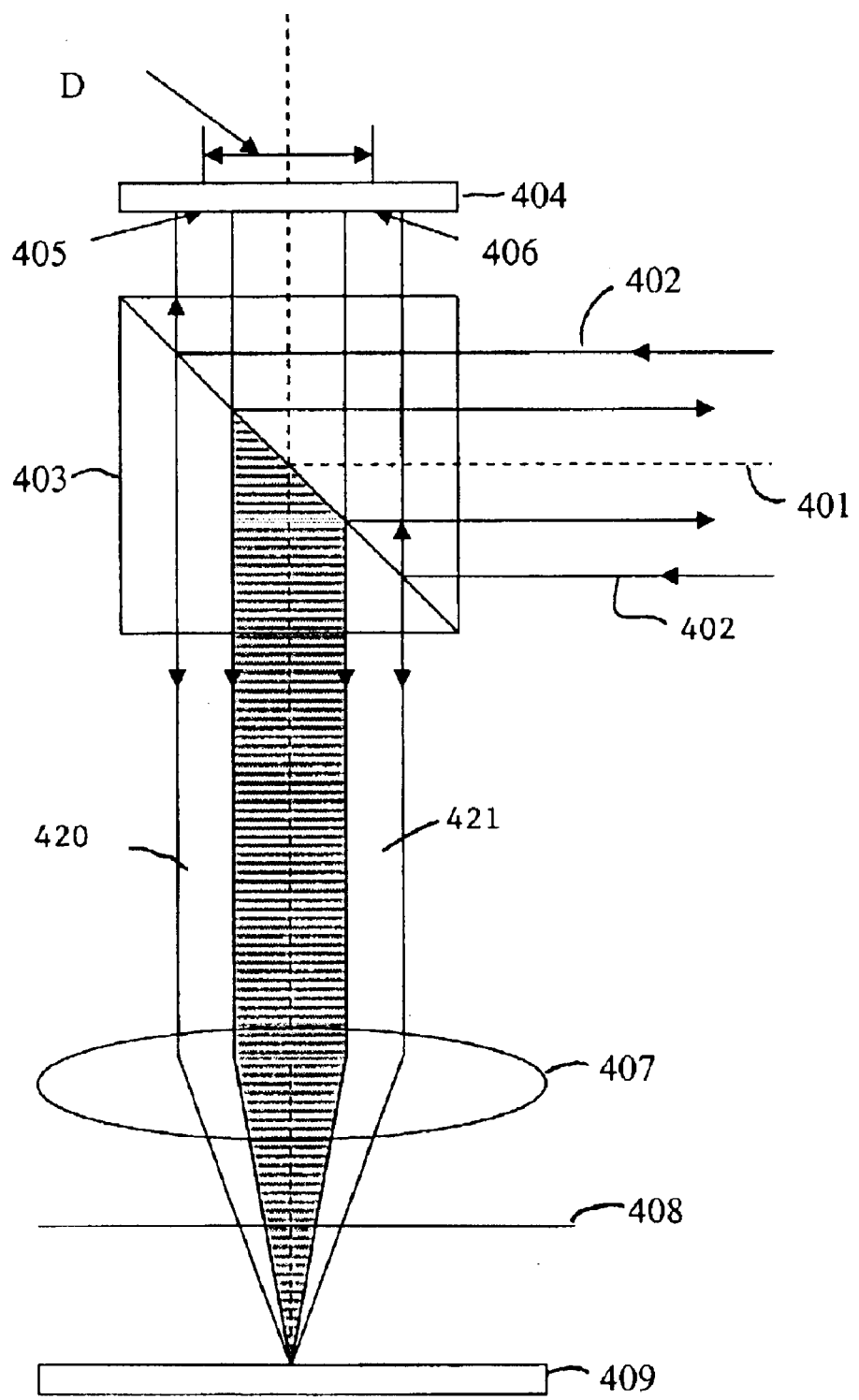
FIG. 4($a$) is a diagram of a first embodiment of the present invention using a polarization beamsplitter and reflecting a laser beam of an LCD.
Figure 4B:
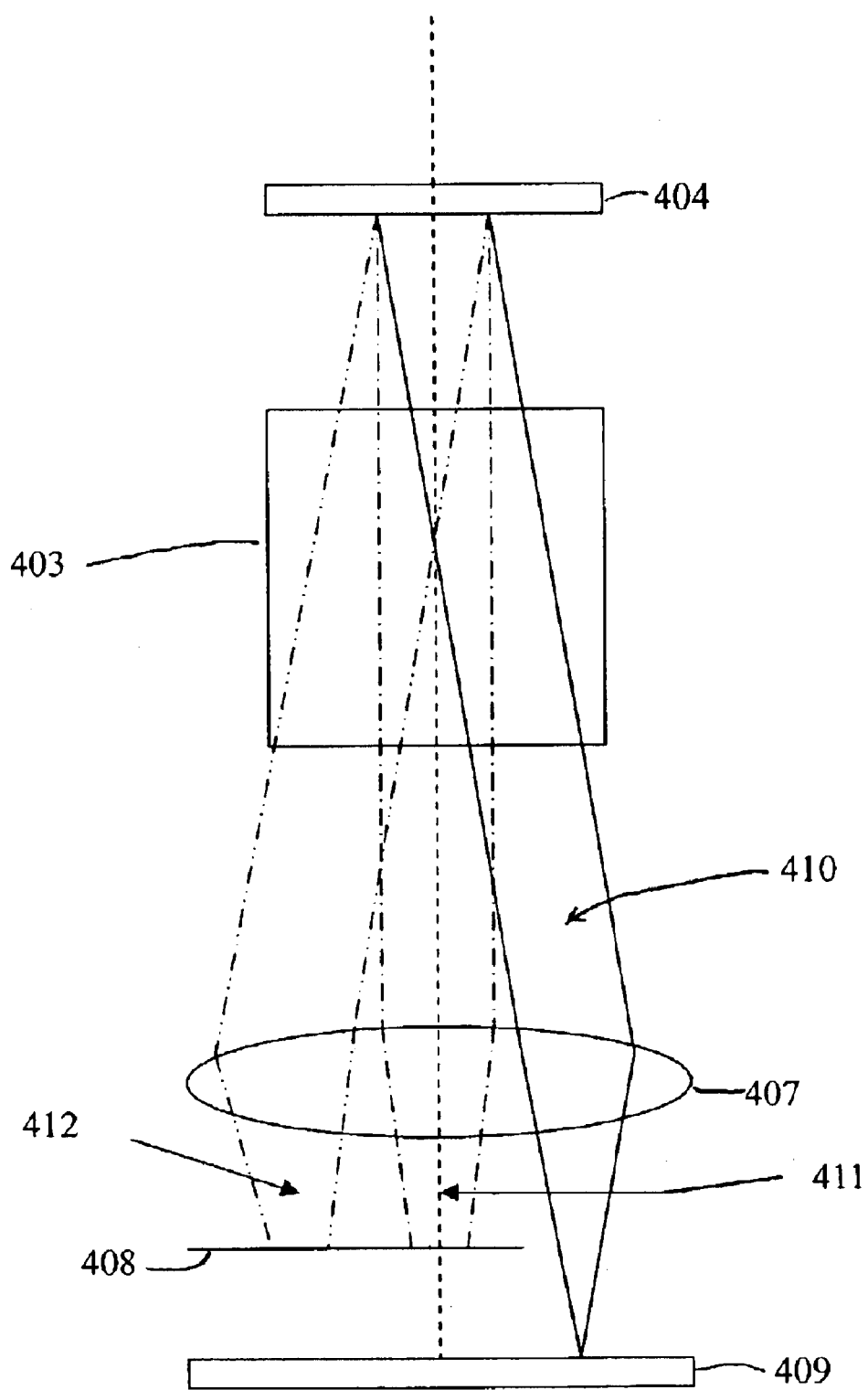

In FIG. 4(a) two regions 405 and 406 of the liquid crystal display have voltages applied. Therefore, beams reflected back from regions 405 and 406 of the liquid crystal display panel can pass through the polarization beam splitter 403 toward lens 407. Light reflected back from regions of the liquid crystal display where voltage has not been applied will be reflected by polarization beamsplitter towards the laser source (this is the middle, shaded area between the two beams 420, 421. This produces two separate beams, 420, 421, each with a different pattern from the LCD panel. The two beams, after passing through an aperture 408, are then focused on a recording medium 409. The two beams interfere on the surface of medium 409 to produce the desired grating pattern. The recording medium can then be moved so the next spot can be recorded, and the process continued until the recording medium has stepped through all the spots of a desired area on the recording medium. FIG. 4(b) is a side view of the optical system which shows a display 404 emitting diffracted beams of light of multiple orders, which pass through beamsplitter 403, and are focused by lens 407 on recording medium 409, with some of the diffracted orders being blocked by a blocking element 408 with an aperture on the right side. The +1$^{st}$ order, 410, a 0$^{th}$ order, 411 and a −1$^{st}$ order 412 are diffracted waves from the LCD panel. Blocking element 408 blocks beams 411 and 412. Only beam 410 is focused by lens 407 on the recording plane 409. The image suitable for recording is not on the optical axis of the lens.

In the first embodiment of the present invention, the LCD panel is used to shape the beam profile on the recording plane. The beam profile is the Fourier transform of the desired grating pattern on the recording medium. Lens 407 acts as a Fourier transform lens to generate the desired grating pattern.

Figure 5A:
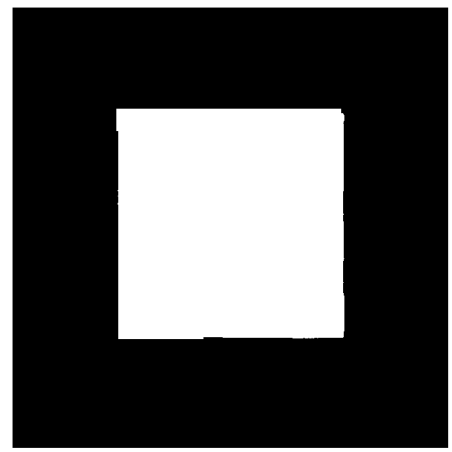
FIG. 5($a$) is a diagram of a square aperture in the light blocking element.

For example, if a beam profile with a square shape such as shown in FIG. 5(a) is required for the matrix recording, the pattern displayed on the panel is in the form of the function below:

$$f_1(x, y, \varphi) = 1 + \left(\frac{\sin\pi x}{\pi x}\right)\left(\frac{\sin\pi y}{\pi y}\right)\cos\left(\frac{2\pi x}{\Lambda} + \phi\right).$$

Figure 5B:
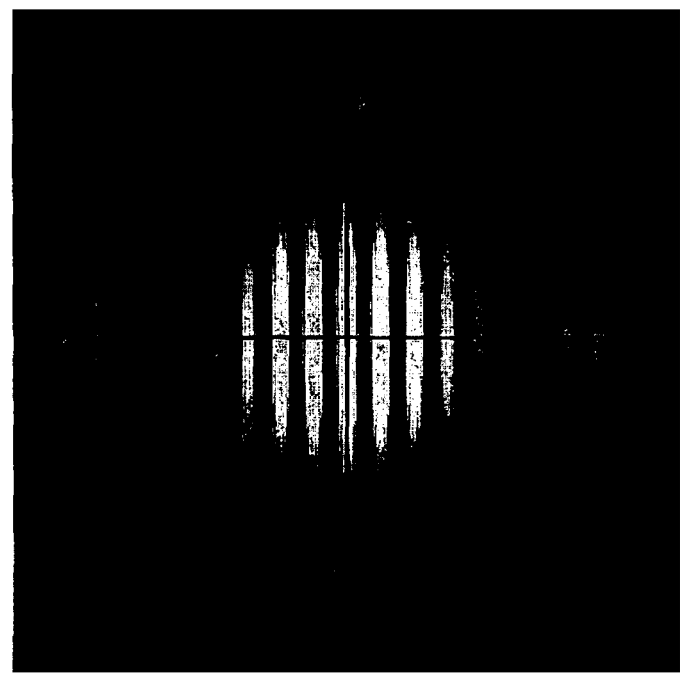

FIG. 5(b) shows the variation of this function. The cosine function $$\cos\left(\frac{2\pi x}{\Lambda} + \phi\right)$$

in $f_1(x, y, \phi)$ is used as a carrier to preserve the phase information of the function $$\left(\frac{\sin\pi x}{\pi x}\right)\left(\frac{\sin\pi y}{\pi y}\right).$$

Figure 6:
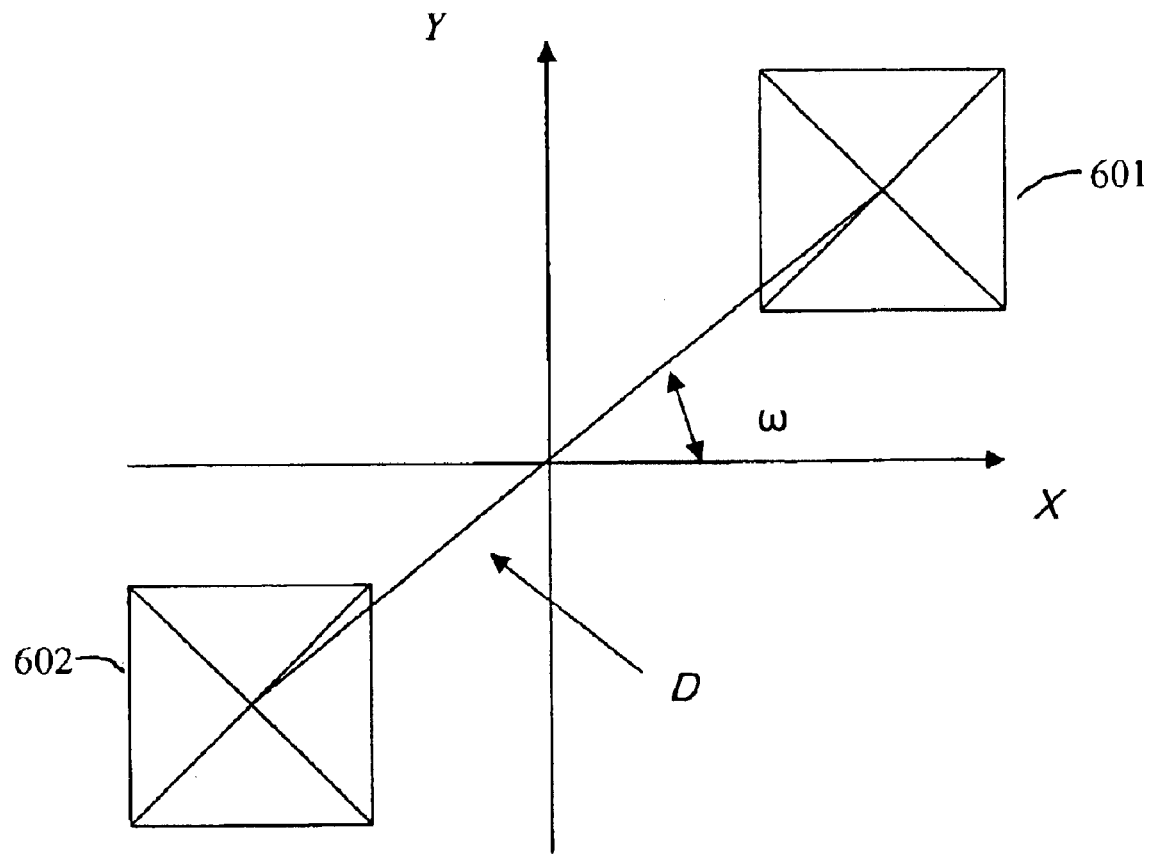
FIG. 6 is a diagram illustrating the locations of the beam patterns on the display panel.

The two beams reflected from the display panels have wavefronts proportional to $f_1(x+x_1, y+y_1, \phi_1)$ and $f_1(x+x_2, y+Y_2,\phi_2)$ respectively, where $$x_1 = \frac{D}{2}\cos\omega, \quad y_1 = \frac{D}{2}\sin\omega$$
$$x_2 = \frac{-D}{2}\cos\omega, \quad y_2 = \frac{-D}{2}\sin\omega$$

and $\omega$ is the orientation of the two beams on the display panel (see FIG. 6). In FIG. 6 601, and 602 are the locations of the functions $f_1(x+x_1, y+y_1,\phi_1,)$ and $f_1(x+x_2, y+y_2, \phi_2)$ on the LCD surface. It is well known that lens 407 performs a Fourier transformation on the wavefront of the beams. Therefore, the intensity pattern on the back focal plane of lens 407 is proportional to $$I(u, v) = \left|F_1(u, v)e^{\left(\frac{j\pi D}{\lambda F}(u\cos\omega + v\sin\omega)\right)} + F_1(u, v)e^{\left(\frac{-j\pi D}{\lambda F}(u\cos\omega + v\sin\omega)\right)}\right|^2,$$

where $F_1(u, v)$ is the Fourier transform of $f_1(x, y, \phi)$

Then the intensity pattern $I(u,v)$ on the back focal plane of lens 407 becomes $$I(u, v) = \left|F_1(u, v)e^{\left(\frac{j\pi D}{\lambda F}(u\cos\omega + v\sin\omega)+\varphi_1\right)} + F_1(u, v)e^{\left(\frac{-j\pi D}{\lambda F}(u\cos\omega + v\sin\omega)+\varphi_2\right)}\right|^2$$

$$I(u, v) = |F_1(u, v)|^2\left[1 + 2\cos\left(\frac{2\pi D}{\lambda F}(u\cos\omega + v\sin\omega) + (\varphi_1 - \varphi_2)/2\right)\right]$$

As can be seen, the shape of the dot is determined by the function $$|F_1(u, v)|^2$$

and the period of the fringes is equal to $$\frac{\lambda F}{2D}.$$

The fringes are rotated by an angle $\omega$ with respect to the coordinates of the recording plane. The phase ($\phi_1$-$\phi_2$) can be used to provide the continuity of the fringes across the recording dot.

Figure 1:
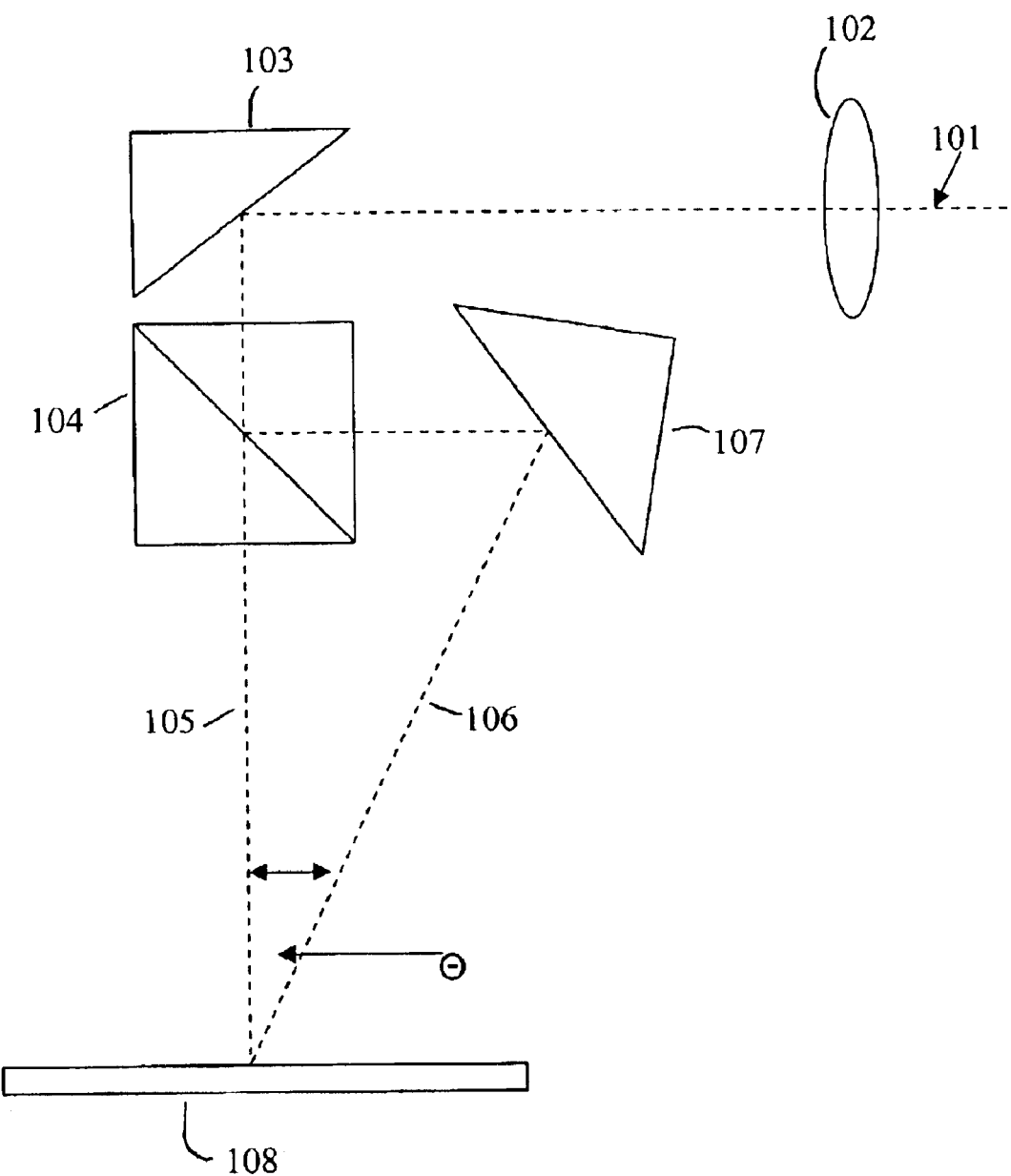
FIG. 1 is a diagram of a prior art dot matrix grating device according to Taiwan Patent 263565.
Figure 2:
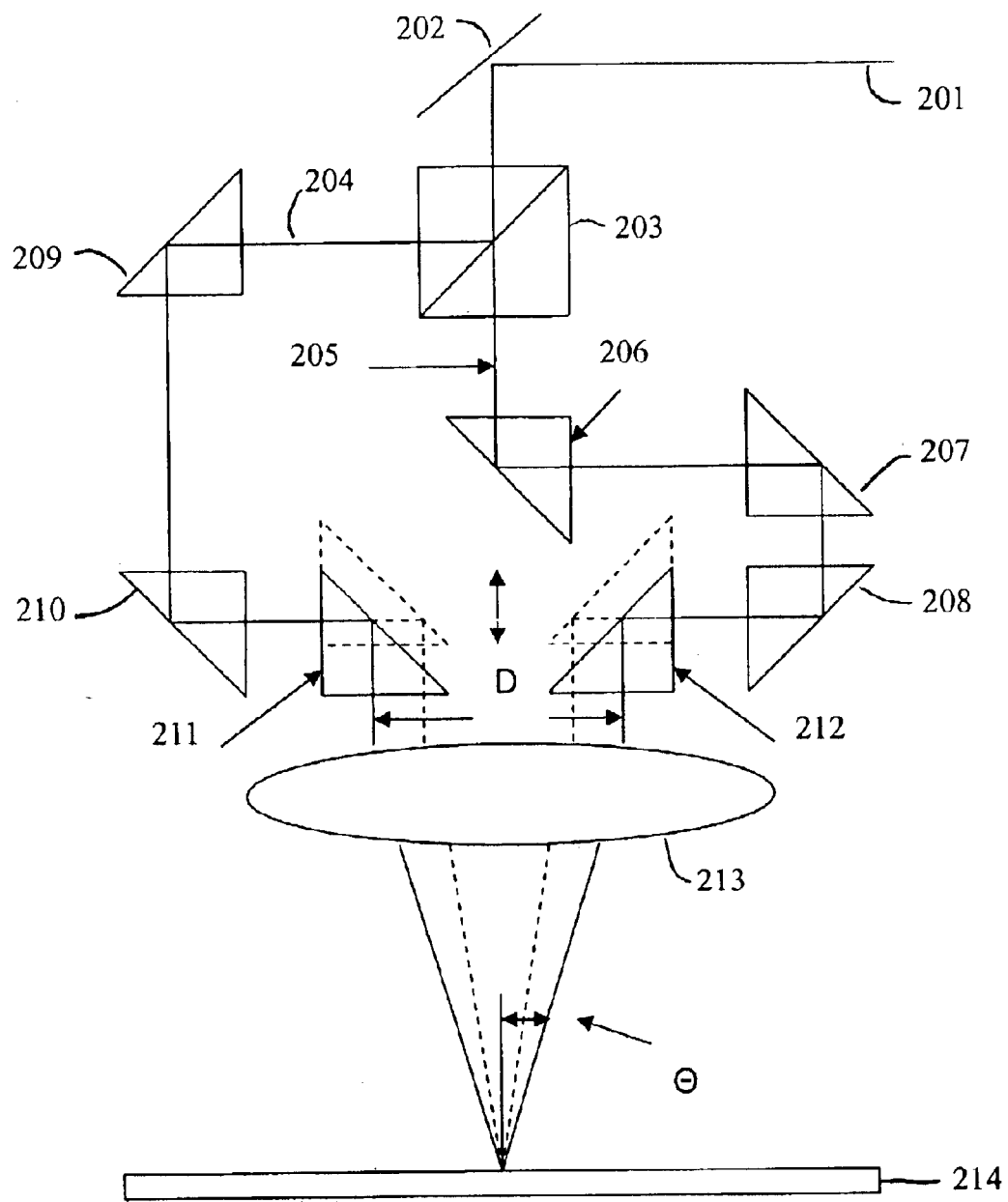
FIG. 2 is a diagram of a more recent prior art dot matrix grating device.
Figure 3:
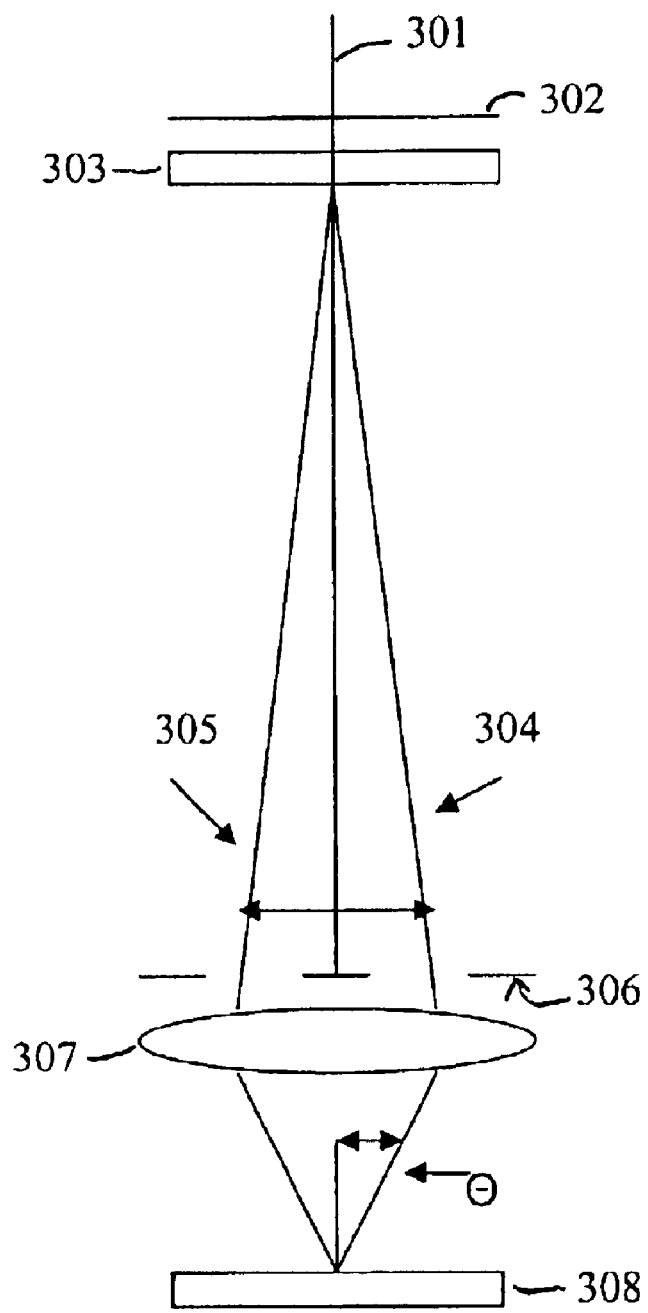
FIG. 3 is a diagram of a prior art dot matrix grating device according to U.S. Pat. No. 5,291,317.
Figure 7A:
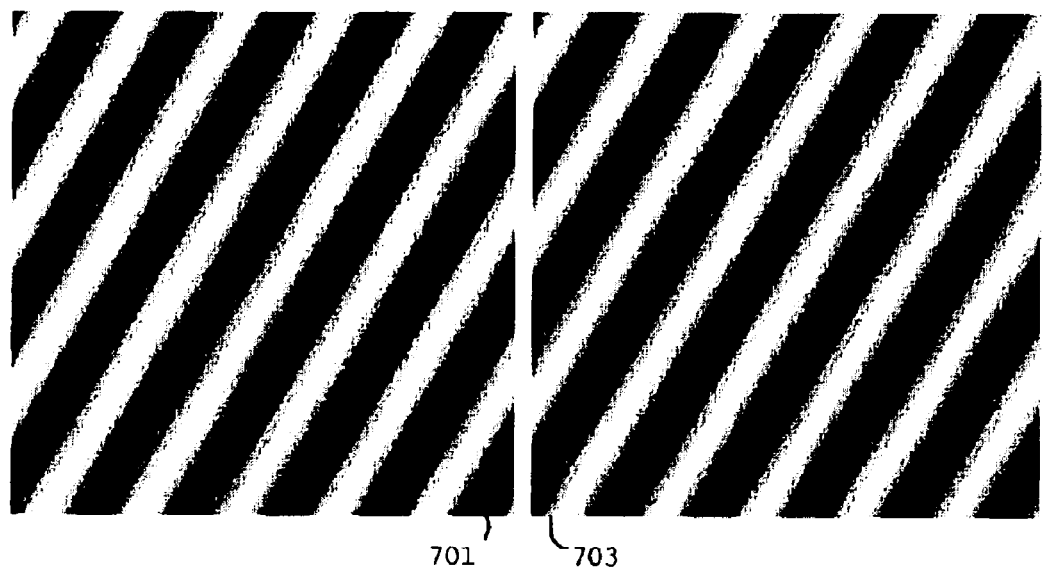
FIG. 7($a$) is a diagram of adjacent grating spots on the recording medium with the same fringe pattern.

In dot matrix systems such as shown in FIG. 1 to FIG. 3, grating spots are recorded consisting of a plurality of fringes, each fringe formed from a number of dots, or pixels. The medium is moved to step the desired pattern across the medium. A problem arises when the identical pattern is desired for multiple spots. When the adjacent grating spots have identical period and orientation, the fringes are not usually contiguous across the boundary of the spots as shown in FIG. 7(a). As can be seen, fringes 701 and 703 do not line up. This is a fundamental limitation of all the dot matrix systems today.

Figure 7B:
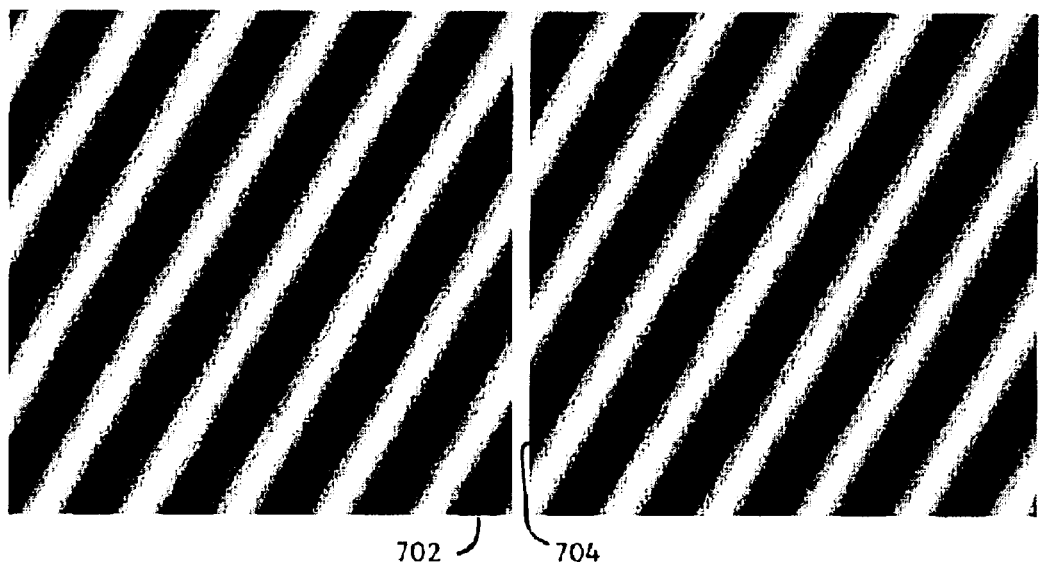

In the present invention, the relative phase of the two beams can be changed from one grating spot to the next. As a result, when the adjacent spots have the same grating period and orientation, the fringes can be made contiguous as though the grating is formed as one large grating and not consisting of spots. The continuity of the fringes across adjacent spots is demonstrated in FIG. 7(b). As can be seen, fringes 702 and 704 are aligned.

This first embodiment of the present invention can further be understood through some basic relationships among the various optical parameters. Suppose that the width of beams 405 and 406 is equal to W, the distance of separation between the two beams is D, and the focal length of lens 407 is F.

The incident angle of the two beams at the recording surface is equal to $$\theta = \tan^{-1}\left(\frac{D}{2F}\right)$$

The period of the interference fringes is equal to $$T = \frac{\lambda}{2\sin\theta}.$$

The spot size on the recording plane is given by $$\delta = \frac{\lambda F}{W}.$$

Using F=10 mm, W=2 mm, λ=0.5 μm, the spot resolution δ=2.5 μm. The image on the recording plane will be composed of multiple of this resolution dots. The pattern displayed on the panel is the Fourier transform F(x,y) of the image of an aperture of arbitrary shape on the recording plane. A typical pattern on the display panel will take the following mathematical form $$f(x, y, \varphi) = 1 + |F(x, y)|\cos\left(\frac{2\pi x}{\Lambda} + \phi(x, y)\right).$$

When the distance D separating the two patterns on the display panel is equal to 5.16 mm, the fringe period on the recording plane is equal to 1 μm.

Figure 8:
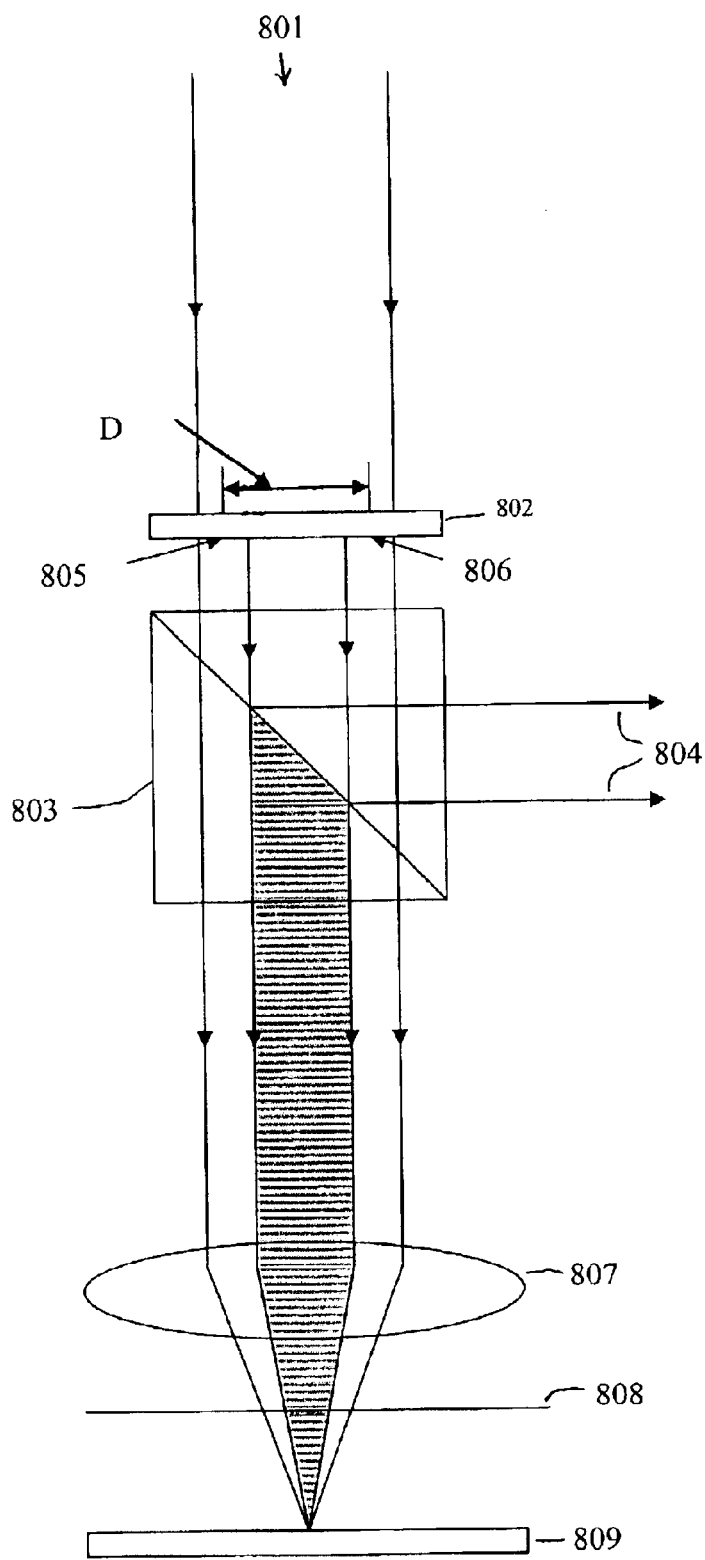
FIG. 8 is a diagram of a second embodiment using a laser source behind the display panel with projects a beam through the display panel.

FIG. 8 show a second embodiment of the present invention. The LCD panel 802 is a transmission type display. Incident beam 801 passes through LCD panel 802. The portions of the incident passing through the activated regions 805, 806 will be transmitted through the polarization beam splitter 803. The portion of the beam passing through inactivated regions of the LCD panel will be reflected as indicated by beam 804. The two beams pass through lens 807 and blocking element 808 to have the +1 orders of the beam combined on the surface of recording medium 809. The principle of operation of this embodiment is identical to that as shown in FIG. 4.

Figure 9:
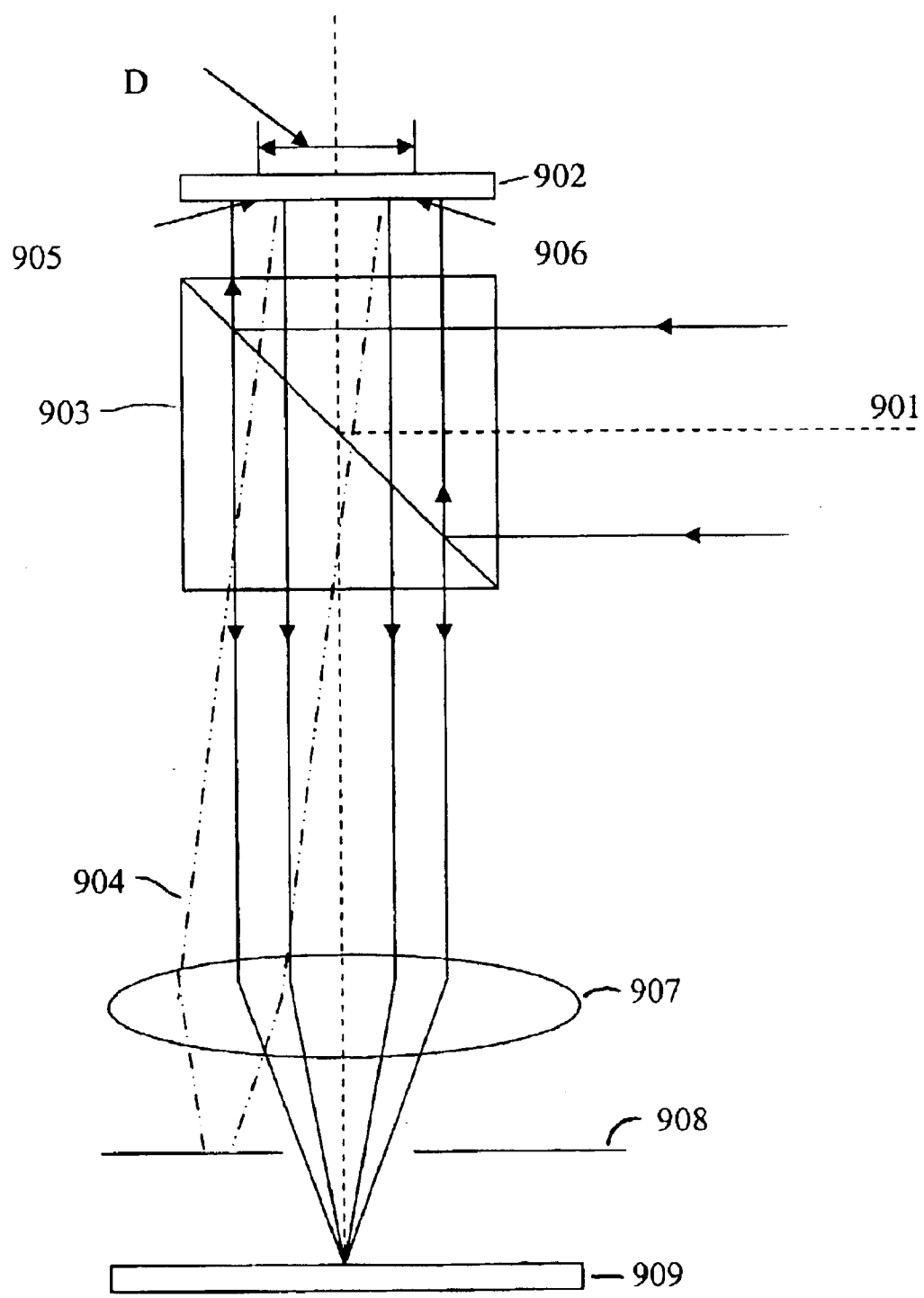
FIG. 9 is a diagram of a third embodiment using phase modulation instead of amplitude modulation.

FIG. 9 shows a third embodiment of the present invention. In this embodiment the LCD panel is a reflective device, and the structure is similar to FIG. 4(*a*). An incident laser beam 901 is directed by polarization beamsplitter 903 to LCD 902. Regions 905 and 906 of the LCD provide the Fourier transform of the desired pattern. The reflected light passes again through polarization beamsplitter 903, resulting in two beams. The two beams pass through lens 907, blocking element 908 and are combined on recording medium 909. Note that blocking element 908 allows the 0 order beam to pass in this embodiment.

This embodiment uses phase modulation by the LCD, instead of amplitude modulation as in the previous embodiments. The light beam reflected through the liquid crystal layer will acquire a phase shift proportional to the voltage applied to the liquid crystal layer. As a result, this particular LCD panel is a phase modulator, whereas the previous LCD panels are amplitude modulators. When a function f(x,y)+φ is displayed on the LCD panel, the light beam reflected off the LCD panel is now characterized by function $$s(x,y,\phi) = e^{jf(x,y)+j\phi}$$

The intensity pattern on the recording surface is proportional to the Fourier transform of s(x,y,φ). The hologram which has only phase variation is called a kinoform (U.S. Pat. No. 4,510,575). The unique property of the kinoform is that it has only 0th order diffraction. Hence, the theoretical diffraction efficiency can be as much as 94%. There will be a few percentage of light scattered about the image. Since the LCD panel is a phase modulator, all the light incident on the LCD panel will be reflected from its surface. In the region outside regions 905 and 906 a linear phase will be applied so that the reflected beam 904 will be diffracted away from the optical axis of the lens. The stop 908 is used to block out the off-axis diffracted light.

Figure 10:
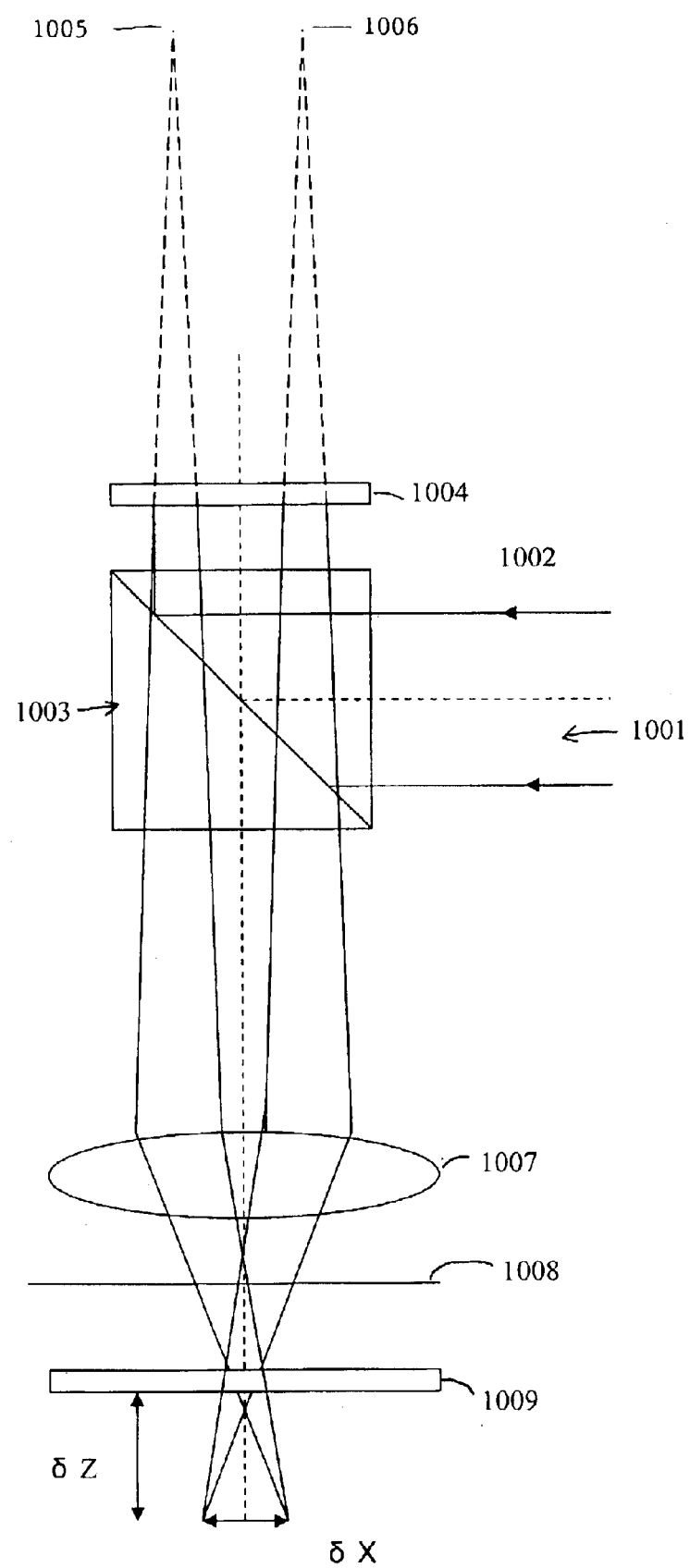
FIG. 10 is a diagram of an embodiment wherein the patterns are focused beyond the recording medium to give a larger spot size.

FIG. 10 shows a 4th embodiment of the present invention. The incident laser beam 1001 is directed to LCD 1004 as in FIG. 4(*a*). However, the patterns on the LCD cause the reflected beams to diverge, as if originating from points 1005 and 1006. The beams pass through beamsplitter 1003 and are thus focused by lens 1007 behind recording medium 1009, resulting in a larger spot. Unwanted diffracted orders are blocked by blocking element 1008 as before.

In this embodiment the pattern displayed on the electronic display panel is proportional to $$f(x, y, \varphi) = 1 + B(x, y) \otimes \cos\left(\frac{2\pi x}{\Lambda} + \frac{\pi(x^2 + y^2)}{\lambda Z} + \phi\right),$$

where B(x, y) is a beam shaping function, ⊕ is the symbol denoting a convolution operation between the two functions on either side of the symbol, the quadratic phase function $$\frac{\pi(x^2 + y^2)}{\lambda Z}$$

in the argument of the cosine function is that of a thin lens with focal length Z and the function φ(x,y) is used to shape the interference fringes. To form a square shape the function B(x,y) is equal to $$\left(\frac{\sin\pi x}{\pi x}\right)\left(\frac{\sin\pi y}{\pi y}\right)$$

as discussed earlier. Because of the quadratic phase function $$\frac{\pi(x^2 + y^2)}{\lambda Z},$$

the beams from the electronic display panel focus at a plane slightly further from the true focal plane of lens 1007. The shift in distance is approximately equal to δZ=F²/Z. The size of the overlapping beams at the focal plane of lens 1007 is approximately equal to $$\delta = \delta Z(F/W) = \frac{F^3}{ZW}.$$

This relationship shows that the quadratic phase function allows the adjustment of the spot size on the recording plane. For example, for F=20 mm, W=1 mm, and δ=0.04 mm, the focal length Z in the quadratic phase function is equal to 200 meters. A larger spot size has been accomplished without changing the distance between the recording plane 1009 and the lens 1007. The fringes within the grating dot is given by $$I(x) = \left[\sin\left(\frac{2\pi x}{T} + \phi_2 - \phi_1\right)\right]^2 = \frac{1}{2}\left[1 + \cos\left(\frac{4\pi x}{T} + \phi_2 - \phi_1\right)\right]$$

where $$T = \frac{\lambda}{2\sin\theta}.$$

The phase functions in the argument can be used to shape the fringes inside the grating dot ad make the fringes continuous across the grating dots.

The advantages of embodiments of the present invention include:
1. The LCD panel modulates the phase or the amplitude of the light beam. Hence no light shutter or attenuator is needed.
2. The distance D between the two beams on the display panel can be used to control the period of the fringes on the recording material.
3. The spot size and shape of the beam on the recording medium is controlled by the function f(x,y) displayed on the LCD panel.
4. The phase difference φ in the displayed function f(x,y) can produce contiguous fringes across adjacent dots.
5. The adjustments of system parameters are all done by electronic means.

As will be understood by those of skill in the art, the present invention can be embodied in other specific forms or embodiments without departing from the essential characteristics thereof. For example, the beamsplitter in FIG. 8 could be replaced with a polarization filter. Accordingly, the foregoing description is intended to be illustrative, but not limiting, of the scope of the invention which is set forth in the following claims.

What is claimed is:

1. An opto-mechanical system for projecting a grating pattern onto a medium, comprising:
   an electronic display panel displaying a pattern;
   a laser source configured to direct a laser beam at said electronic display panel;
   a polarization filter positioned between said electronic display panel and said medium to allow only designated polarizations of light from said laser source impinging on said electronic display panel to pass through said polarization filter to said medium;
   a controller connected to said electronic display panel and configured to cause multiple patterns to be displayed on said electronic display panel, forming at least two separate output beams;
   a light blocking element configured to allow only designated orders of said output beams to pass; and
   a lens for focusing said output beams onto said medium so that said output beams interfere to produce said grating pattern on said medium.

2. The system of claim 1 wherein said electronic display panel is a liquid crystal display (LCD).

3. The system of claim 1 wherein said polarization filter is a polarization beam splitter.

4. The system of claim 3 where said laser beam is first reflected off said polarization beam splitter onto said electronic display panel, and is then reflected off said electronic display panel to said polarization beam splitter.

5. The system of claim 1 wherein said laser beam is projected through said electronic display panel.

6. The system of claim 1 further comprising a non-polarizing beamsplitter for directing said laser beam to said electronic display panel.

7. The system of claim 1 wherein said image displayed on said electronic display panel is a Fourier transform of the grating pattern on the medium.

8. The system of claim 1 wherein said medium is a recording medium.

9. The system of claim 1 wherein the pattern on the electronic display panel modulates the amplitude of the incident beam from the laser source.

10. The system of claim 1 where the pattern on said electronic display panel produces at least two non-overlapping beams from said laser beam.

11. The system of claim 1 wherein the pattern on said electronic display panel produces beams from said laser beam with a wavefront that gives a square shaped beam proportional to the function $$f(x, y, \phi) = 1 + \left(\frac{\sin \pi x}{\pi x}\right)\left(\frac{\sin \pi y}{\pi y}\right)\cos\left(\frac{2\pi x}{\Lambda} + \phi\right),$$

where x and y are the coordinates of the pattern and φ is the phase.

12. The system of claim 11 wherein said system is configured to produce a plurality of spots having diffraction fringes on said medium, and the phase φ in the cosine functions, $$\cos\left(\frac{2\pi x}{\Lambda} + \phi\right),$$

is used to produce continuity of fringes across adjacent spots.

13. The system of claim 1 wherein the pattern on the electronic display device changes the phase of the incident laser beam from the laser source.

14. The system of claim 13 wherein the wavefronts of the beams reflected off the electronic display panel contain a quadratic phase which shifts the focal plane of the reflected beams from the electronic display panel to another plane other than the focal plane of the lens.

15. The system of claim 13 wherein a phase variation in the pattern on the electronic display panel produces fringes which have a linear shape.

16. The system of claim 13 wherein a phase variation in the pattern on the electronic display panel produces fringes which have a non-linear shape.

* * * * *